United States Patent [19]

Henrion

[11] Patent Number: 5,314,052
[45] Date of Patent: May 24, 1994

[54] PROGRESSIVE DRY FRICTION CLUTCH PLATE

[75] Inventor: Philippe Henrion, Limoges, France

[73] Assignee: Valeo, Paris, France

[21] Appl. No.: 849,519

[22] Filed: Mar. 11, 1992

[30] Foreign Application Priority Data

Mar. 12, 1991 [FR] France ............... 91 02966

[51] Int. Cl.⁵ .............................................. F16D 13/68
[52] U.S. Cl. ................................. 192/107 C; 192/52
[58] Field of Search ............... 192/107 C, 52, 70.14, 192/113 R; 156/329, 299, 77

[56] References Cited

U.S. PATENT DOCUMENTS

| | | | |
|---|---|---|---|
| 1,862,991 | 6/1932 | Vargha | 192/106.1 |
| 2,253,316 | 8/1941 | Armitage . | |
| 3,231,058 | 1/1966 | Batchelor et al. | 192/113 R |
| 3,961,829 | 6/1976 | Bowen et al. . | |
| 4,277,115 | 7/1981 | Stuwe et al. . | |
| 4,353,537 | 10/1982 | Koufos et al. | 192/107 C X |
| 4,436,193 | 3/1984 | Smirl | 192/107 C |
| 4,821,860 | 4/1989 | Crawford et al. | 192/107 C |
| 5,076,409 | 12/1991 | Graton et al. | 192/107 C |
| 5,076,410 | 12/1991 | Maycock et al. | 192/107 C X |
| 5,137,133 | 8/1992 | Graton et al. | 192/107 C |

FOREIGN PATENT DOCUMENTS

| | | |
|---|---|---|
| 0010698 | 10/1979 | European Pat. Off. . |
| 0063785 | 4/1982 | European Pat. Off. . |
| 0252583 | 4/1987 | European Pat. Off. . |
| 2363692 | 7/1975 | Fed. Rep. of Germany ... 192/107 C |
| 2619536 | 5/1976 | Fed. Rep. of Germany . |
| 849990 | 2/1939 | France . |
| 2255499 | 12/1974 | France . |
| 2450978 | 3/1980 | France . |
| 2624237 | 12/1987 | France . |
| 2191831 | 12/1987 | United Kingdom ............ 192/107 C |

*Primary Examiner*—Rodney H. Bonck
*Attorney, Agent, or Firm*—Morgan & Finnegan

[57] ABSTRACT

A dry friction clutch plate is of the kind having a metallic support plate with ring-shaped friction pads arranged on either side of it. A ring-shaped compression element is arranged between the friction pads, this ring-shaped element being of a cellular material. The cellular material is a deformable material having open and/or closed cavities or pores such as to cause the thickness of the ring-shaped compression element to be reduced when the clutch plate is subjected to compressive stresses, and to cause it to revert to its original thickness on the removal of the compressive stresses.

9 Claims, 2 Drawing Sheets

PROGRESSIVE DRY FRICTION CLUTCH PLATE

FIELD OF THE INVENTION

This invention relates to a dry friction clutch plate.

BACKGROUND OF THE INVENTION

Such a clutch plate is generally formed from a metallic support plate which includes axially deformable portions that constitute a progressive action device, with two ring-shaped friction pads being carried on either side of the support plate. The purpose of the progressive action device is firstly to enable progressive transmission to be received without snatching of the engine torque during an operation of engaging the clutch, and secondly to compensate for geometrical variations in the surface of the clutch.

The friction liners are usually attached to the support plate by riveting. This results in limitation of the useful thickness of each friction liner to that part which lies outside the level of the heads of the securing rivets. For this reason, the weight of the clutch plate is detrimentally increased, and in particular, its inertia is increased. This gives rise to difficulty in achieving synchronism during declutching and gear changing operations.

In order to avoid having to secure the friction pads by riveting, it has already been proposed to attach them adhesively on to flat metallic plates. Resilient arms, made of elastomeric material, are interposed in discrete zones. Such an arrangement is for example described in the specification of United States Pat. No. 2 253 316 and that of French Pat. No. 2 450 977.

In another type of construction, which is described in the specification of published European patent application No. EP 0 252 583A, the friction pads are secured on a flat metallic support plate through circular, concentric beads or bands of elastomeric material.

In these known expedients, the arms or bands of elastomeric material do however have the disadvantage that the elastomer is distributed unevenly. This gives rise to nonuniformity in the deformation of the progressive action device in the region of the friction pads, and also gives rise to premature wear of the latter because the heating which occurs in service is concentrated in zones having somewhat limited local zones of the friction pads.

An elastomeric material such as that used in the present state of the art as described above deforms by a flow action, provided that in all the zones concerned there is sufficient space to enable this to take place. This is in general not the case in known clutch plates.

DISCUSSION OF THE INVENTION

An object of the present invention is to provide a clutch friction plate which does not have the drawbacks discussed above.

According to the invention, a dry friction clutch plate comprising two ring-shaped friction pads, is characterised by a ring-element formed of a cellular material arranged between the said friction pads.

According to a preferred feature of the invention, the cellular material is a deformable material having pores or cavities which are open and/or closed, and which, under the effect of compressive stresses, cause the thickness of the material to be reduced, while when such stresses cease, the pores or cavities cause it to revert to its original thickness.

Preferably, the said cellular material is formed from a material selected from a group comprising: elastomeric foams, such as silicone foams and fluorinated rubber foams; thermoplastic materials moulded with injection of gas to give porosity to the material, for example polyamides and polyetherketones; and thermosetting resin foams having a sufficient softness, for example modified epoxy resin.

In a first embodiment of the invention, the said ring-shaped element of cellular material is located between a friction pad and a metallic support plate.

In a modification, the ring-shaped element of cellular material is located between each friction pad and the associated clutch plate.

In another embodiment of the invention, the ring-shaped element of cellular material is disposed between two metallic support plates which are secured together, with a friction pad being secured on each of the said support plates, for example adhesively.

Preferably, the ring-shaped element of cellular material is adhesively attached at both its sides on to the respective elements with which it is in contact, namely a support plate and a friction pad.

The invention enables a dry friction clutch plate to be obtained having deformability characteristics which are adjustable within a wide choice of values. To this end, and in accordance with another aspect of the invention, it is possible, by arranging the proportion of open cavities to closed cavities suitably, to cause the compressibility, and therefore the progressivity, of the clutch plate, to vary.

According to a preferred feature of the invention, the said cellular material has a porosity in the range 10 to 75% for a thickness equal to, at most, 1.5 mm, and in the range 10 and 90% for a thickness greater than 1.5 mm.

Since the friction pads are able to be in continuous contact on a flat support element, the pads can be secured adhesively. The result is that the useful thickness of the friction pads, that is to say the thickness which can be reduced by wear in operation, is to all intents and purposes nearly the same as the actual thickness of the pad itself. The invention therefore permits the use of friction pads of smaller thickness than pads which have to be secured by rivets, for a given reduction in thickness due to wear.

By reducing the thickness of the friction pads, the mass, and consequently the inertia, of the clutch plate is reduced. This substantially improves the operating conditions of the transmission of the vehicle.

The invention also enables the deformability characteristics of a dry friction clutch plate to be improved.

The cellular material used in the ring-shaped element in a clutch plate according to the invention enables the clutch plate to adapt automatically, as between one point to another, to local differences in the force with which the clutch plate is gripped between a pressure plate and a reaction plate of the clutch. The friction pads can thus more easily adapt and compensate for irregularities in flatness of the pressure and reaction plates, in particular when the latter are subject to deformation under the effect, for example, of heating. Consequently, the useful contact surface of the friction pads with the pressure and reaction plates is substantially identical to the total surface of the friction pads, which enables wear to be distributed homogeneously on the friction pads; and this in turn improves their useful working life.

Also, there is a homogeneous distribution of the heating effect on the friction pads in service, without the occurrence of localised hot spots. Bearing in mind that the wear in a friction material is subject to considerable acceleration when the temperature of the material exceeds a certain value, it will be understood that, by avoiding hot spots, and by maximising the distribution of friction, the invention enables the temperature of the whole of the friction pad to be reduced, and therefore leads to an increase in its service life.

Further features and advantages of the invention will appear more clearly from a reading of the description which follows of various preferred embodiments of the invention, given by way of example only and with reference to the accompanying drawings.

DESCRIPTION OF PREFERRED EMBODIMENTS OF THE INVENTION

Figure 1:
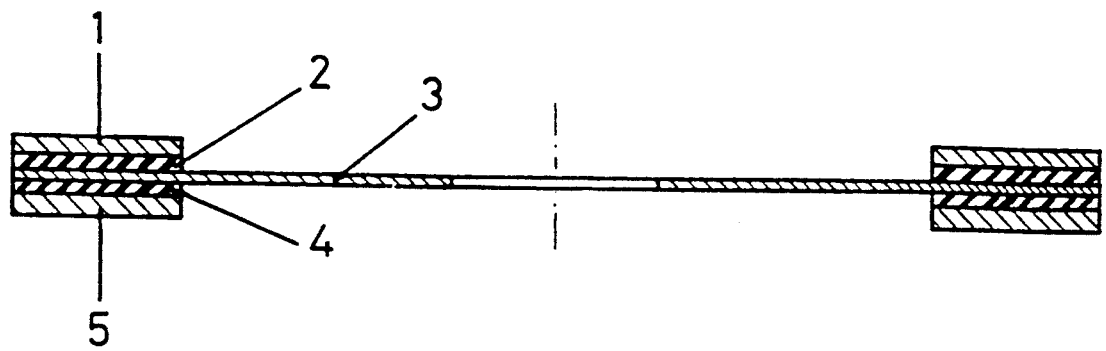
FIG. 1 shows in cross section a dry friction clutch plate sub-assembly in a first embodiment of the invention.

The friction clutch plate sub-assembly shown in FIG. 1 includes a flat metal plate 3 which acts as a support for a group of two friction pads 1 and 5 in the form of flat rings, which are carried on either side of the support plate 3. Each of the friction pads and 5 is secured to the support plate 3, and a ring-shaped element 2, 4 of cellular material is secured adhesively (by any appropriate means) to the support plate 3 and to the corresponding friction pad 1 or 5.

Such a sub-assembly is arranged to be associated with an internally splined hub (not shown) for mounting on a splined shaft, which in practice is an input shaft of a motor vehicle gearbox. The association of the sub-assembly with the hub (not shown) may be obtained through the metallic plate 3, either directly, as described for example in the specification of French Pat. No. 849 990, or through a torsion damping device that includes resilient means, which are interposed in rotation between the support plate 3 and one or more counter plates which are secured to the hub in the manner described for example in the specification of French published patent application No. FR 2 624 237A. Reference is invited to the above mentioned documents for further details, and since those arrangements are well known they will not be described further here. In a modification (not shown), one of the friction pads is secured directly by adhesion on the metallic support plate 3, while a ring-shaped element of cellular material is interposed between the other friction pad and the support plate.

The sub-assembly described above with reference to FIG. 1 is made from the following components. The friction pads 1 and 5 are in the form of ring-shaped pads having an external diameter of 200 mm and an internal diameter of 137 mm. Their thickness is 1.6 mm. They are made of the material which is sold under the reference F202 by the French company Valeo.

The support plate 3 is in the form of a disc having a diameter of 200 mm. and, a thickness of 0.6 mm, made of XC70 steel. Each ring-shaped element 2 and 4 of cellular material has an external diameter of 200 mm and an internal diameter of 137 mm, with a thickness of 2 mm. The ring-shaped elements 2 and 4 are made of a silicone foam of the kind sold by the General Electric Company under the catalogue No. RTF762. Their porosity is preferably in the range between 10 and 90%. The proportion of closed pores or cavities in this foam is about 60% of the total number of cavities.

The above sub-assembly is made in the steps described below. The clutch plate 3 is first cleaned by an abrasive process, followed by degreasing with a chlorinated solvent such as trichlorethylene. An adhesion primer for silicone, such as that sold under the catalogue No. A4094 by the company Rhône-Poulenc, is then applied using a felt roller onto the support plate 3 and also on each of the faces of the friction pads 1 nd 5 which are to be placed in contact with the ring-shaped elements 2 and 4 of cellular material. After the priming coat has dried for about 30 minutes, the various surfaces so primed are coated with an adhesive of a silicone type, such as that which is sold under the reference CAF4 by the company Rhône-Poulenc.

Final assembly of the sub-assembly is then carried out in the following way. Inside a cylinder having an internal diameter corresponding to the outer diameter of the various components of the sub-assembly, there are arranged, in this order: a first friction pad 5; a ring-shaped element 4 of cellular material; the support plate 3 itself; a second ring-shaped element 2 of cellular material; and a second friction pad 1. The cylinder is then closed by means of a piston, to which a pressure of 1 bar is applied at ambient temperature for a period corresponding to the curing of the adhesive.

It has been possible to determine that the sub-assembly thus obtained has a deformability of 0.8 mm under a load of 3500 N corresponding to the load applied by a clutch mechanism. It has also been established that the inertia is reduced by 20% by comparison with a standard arrangement in which the friction pads are secured by means of rivets on corrugated metal supports. Friction and wear tests on test beds and also on vehicles, have also demonstrated an improvement over the friction and wear performance of a standard clutch plate.

Figure 2:
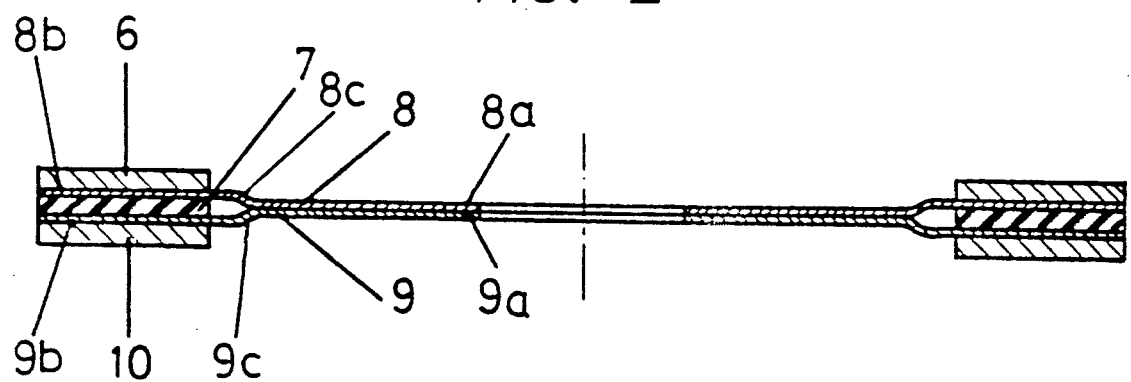
FIG. 2 shows in cross section a dry friction clutch plate sub-assembly a second embodiment of the invention.

Referring now to FIG. 2, the sub-assembly shown in that FIGURE consists of two juxtaposed metal support plates 8 and 9, with a respective ring-shaped friction pad 6 or 10 secured to one outer face of each support plate 8, 9 by adhesion. At least one of the clutch plates 8 or 9, and preferably (and as shown) each of them, has a flat central portion 8a, 9a and a flat peripheral portion 8b, 9b, on which the friction pads 6 and 10 are respectively fixed. In each of the support plates 8 and 9, the peripheral portion 8b or 9b is axially offset from the corresponding central portion 8a or 9a by means of a respective knee portion 8c, 9c. The support plates 8a and 9a are located in such a way that their central portions 8a and 9a are in contact with each other, with the knee portions 8c and 9c being directed away from each other in such a way that the peripheral portions 8b and 9b are spaced apart from each other, so as to define between them a ring-shaped gap. This gap is filled with a cellular material 7 in a ring-shaped configuration, which is at least partially secured adhesively to at least one of the support plates 8 and 9 on the peripheral portion 8b or 9b of the latter. A respective one of the friction pads 6 and 10 is attached to the opposite face of the respective support plate.

In this embodiment, the radial dimension of the ring element 7 of cellular material is identical to the corresponding radial dimension of the friction pads 6 and 10, while a radially inner portion of the space lying between the peripheral portions 8b and 9b of the support plates is left empty of the cellular material 7. As in the case shown in FIG. 1, the friction pads 6 and 10 lie in alignment with the ring element 7 of cellular material.

Figure 3:
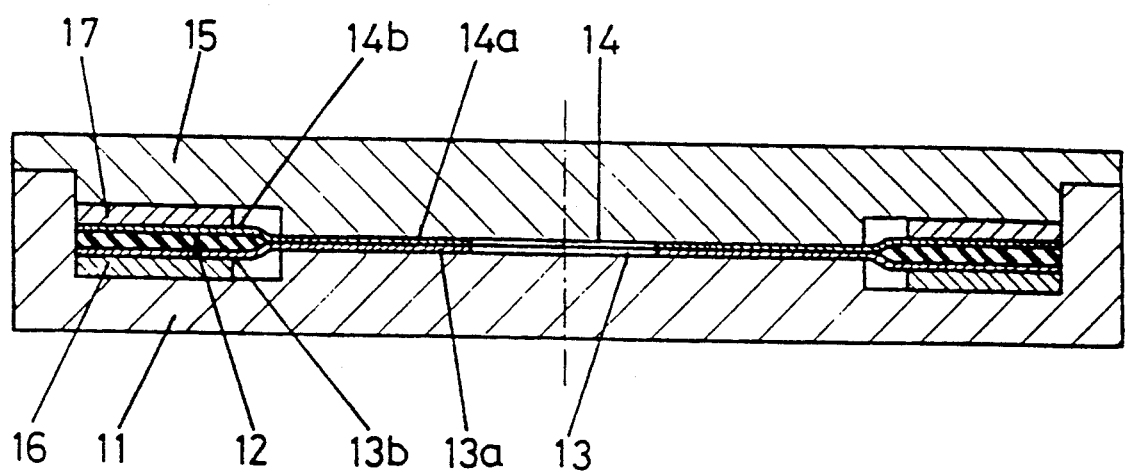
FIG. 3 hows in cross section a dry friction clutch plate sub-assembly in a third embodiment of the invention, during its manufacture in a mould.

In the embodiment shown in FIG. 3, in which the sub-assembly is in the same form as in FIG. 2, the ring element 12 of cellular material fills the whole of the space defined between the peripheral portions 13b and 14b of the metallic support plates 13 and 14, in such a way that the ring element 12 has a larger radial extent than the ring-shaped friction liners or pads 16 and 17 with which it is aligned.

It will be noted that in the embodiments shown in FIGS. 2 and 3, the torque is transmitted during a manoeuvre of the clutch directly from a friction pad to the adjacent support plate, which avoids any shear forces acting on the ring element of cellular material.

The elements constituting the sub-assembly described with reference to FIG. 2 have the following features. The friction pads 6 and 10 are each in the form of a ring having an external diameter of 200 mm and an internal diameter of 135 mm, with a thickness of 1.6 mm. They are made of the material which is sold under the catalogue No. F202 by the company Valeo. Each of the support plates 8 and 9 is made of XC70 steel, and has a thickness of 0.3 mm and an outer diameter of 200 mm.

The cellular material 7 is in the form of a ring having an outer diameter of 200 mm and an inner diameter of 127 mm, with a thickness of 4 mm. This cellular ring consists of 20g of silicone type foam such as the foam which is sold under the catalogue No. RTV1525 by the company Rhône-Poulenc. Its porosity preferably lies in the range between 10 and 90%.

The elements of the sub-assembly shown in FIG. 3 have the same characteristics and dimensions, except as regards the inner diameter of the ring element 12 of cellular material, which is 115 mm so as to correspond to the diameter on which are to be found the knee portions of the support plates 13 and 14.

The sub-assembly is manufactured from the components described above in the following way. A chemical cleaning step is first carried out, for example using hydrochloric acid, on the support plates 8 and 9 or 12 and 13, followed by soda passivation and then a drying step. The friction pads 6 and 10 or 16 and 17 are then coated with an adhesive having a phenolic resin base. The friction pads 6 and 10 or 16 and 17 are then applied adhesively on to the respective plates which thereby act as a support. This step is carried out by hot pressing at a temperature of the order of 180° C.

The faces of the support plates 8 and 9 or 13 and 14 opposite those on to which the friction liners are adhesively secured are abraded using an emery disc, and then cleaned with a chlorinated solvent such as trichlorethylene, before being coated with a silicone primer such as that sold under the catalogue No. A4094 by the company Rhône-Poulenc. Drying is then carried out for thirty minutes.

Using an appropriate machine, a circular ring element is formed with a measured quantity of 20g of a silicone base composition containing foaming agents, as sold under the catalogue No. RTV1525 by the company Rhône-Poulenc. This is applied on the primer coating of one of the support plates 8, 9 or 13, 14. The quantity of foaming agent used is so determined that a porosity lying in the range between 10 and 75% will be obtained for a thickness of silicone foam up to, but not exceeding, 1.5 mm, and between 10 and 90% for a thickness greater than 1.5 mm.

This ring element is then placed in a mould 11 (FIG. 3), in such a way that the friction pad is at the bottom of the mould, with the band of coating material previously applied lying on its upper surface. Another support plate 9, 8 or 14, 13 is then placed on top of the previous one, in such a way that the adhesive primer previously applied comes into contact with the said band, with the corresponding friction pad lying in the upper part of the mould. The mould is then closed by means of a piston 15, and is then placed in a tunnel oven in which it is brought to a temperature of 180° C. and maintained at that temperature for a time which is sufficiently long to enable the silicone material to become foamed and cured. During this latter phase, the foam is developed so as to fill the ring-shaped gap, while also adhering to the peripheral portions 8b, 9b or 13b, 14b of the support plates 8, 9 or 13, 14 respectively.

The mould 11 and piston 15 thus enables the final spacing between the support plates 14 and 13 to be controlled. In this way a friction clutch plate sub-assembly is produced which has an inertia reduced by 25% as compared with a standard arrangement having bent fins and riveted friction pads. Measurements have revealed that the friction clutch plate has a creep of 0.9 mm under a load of 3500 N corresponding to the load applied by the clutch mechanism.

The results of tests carried out on test beds and also on vehicles reveal levels of friction which are equivalent or even superior to a standard arrangement using the same friction pad. It is also established that the friction pads undergo wear in a more regular manner than in the standard arrangements. In particular, it has been shown that under equal conditions, the difference in thickness caused by wear between the inner diameter and the outer diameter of each of the friction pads was less than 0.05 mm in a sub-assembly of the kind described above, while with sub-assemblies having progressive vanes and riveted friction pads the difference due to wear between one diameter and the other may reach values in the range between 0.08 mm and 0.1 mm.

In a modification, the ring element 7 of cellular material seen in FIG. 2 may be preformed in the manner described above with reference to FIG. 1, and then adhesively secured to the support plates 8 and 9, again in the same way as described with reference to FIG. 1.

In another type of modification of the sub-assembly described with reference to FIGS. 2 and 3, two flat metallic support plates are used, these being held spaced away from each other by means of a ring which may be removed after insertion or moulding of the cellular material.

In yet another modification which is not shown, the ring element 2 and/or 4 or 7 or 12, made of cellular material, is built up from a series of elementary layers which are preferably secured together.

As indicated above, it is possible while the cellular material is being formed, to adjust the deformability characteristics of the clutch friction plate by determining and adjusting the general proportion of the cavities as well as the relative proportions of closed and open cavities. Similarly, the pores or cavities, whether closed or open, may take various shapes, and in particular may be generally spherical or tubular. This gives a considerable further advantage as compared with known arrangements having resilient vanes or with arms or bands of elastomeric material.

A ring element of cellular material is preferably fixed by simple adhesion on to a support plate and/or on to a friction pad during formation of the cellular material, and in particular while the latter is being cured. In addition, since the selected cellular materials have damping characteristics, it can be arranged that on declutching, a clutch friction plate does not immediately return to its initial thickness, which facilitates clean declutching.

The various metallic support plates 3 or 8, 9, or 13, 14, may, and preferably do, have cut-out portions for reducing their weight, increasing their flexibility or avoiding strains and deformations due to any possible heating when in service.

What is claimed is:

1. A dry friction clutch plate for applying progressive transmission of engine torque through a motor vehicle drive train through selective application of compressive forces to at least one ring-shaped support plate, the clutch plate comprising two flat ring-shaped friction pads secured on opposite sides of the ring-shaped support plate at periphery thereof, a flat resilient ring-shaped compression element of a porous material inserted between said pads, the porous material being a predetermined porosity and uniformly distributed between said pads, the support plate being disposed between said friction pads, said compression element predetermined porosity imparting sufficient resiliency to said compression element to absorb the selectively applied motor vehicle drive train compressive forces for the progressive transmission of the engine torque therethrough.

2. A friction clutch plate according to claim 1, wherein said porous material has a porosity in the range 10 to 75% where its thickness is in a range up to and including 1.5 mm, and in the range 10 and 90% where its thickness is greater than 1.5 mm.

3. A friction clutch plate according to claim 2, wherein said porous material is a deformable material having cavities comprising open cavities in the range 0 to 100% and closed cavities in the range 0 to 100%, whereby when said flat ring-shaped element is subjected to compressive stresses, the cavities cause its thickness to decrease, and on removal of such stresses the cavities cause it to revert to its original thickness.

4. A friction clutch plate according to claim 3, wherein said porous material is selected from the group comprising elastomeric foams, thermoplastic materials moulded with injection of gas to cause porosity to occur, and thermosetting resin foams having sufficient softness.

5. A friction clutch plate according to claim 2, further including a metallic support plate, with said flat ring-shaped compression element being placed between a said friction pad and the support plate.

6. A friction clutch plate according to claim 5, wherein a said flat ring-shaped element is placed between each friction pad and the associated support plate.

7. A friction clutch plate according to claim 2, further comprising two metallic support plates secured together, with one said flat ring-shaped friction pad being fixedly carried by a respective one of said support plates, said flat ring-shaped friction pad compression element being arranged between the two support plates.

8. A friction clutch plate according to claim 5, further including adhesive means securing said flat ring-shaped compression element to the friction pad and to the metallic support plate between which it is placed.

9. A friction clutch plate according to claim 7, wherein each support plate comprises a flat central portion and a flat peripheral portion joined to the central portion, with each flat ring-shaped friction pad being attached to the peripheral portion of the associated support plate, the two central support plate portions being joined together, and the peripheral portion of at least one of the support plates being axially offset from the central portion of the latter so as to define between the two support plates a ring-shaped radial space, with said flat ring-shaped compression element being disposed within said radial space.

* * * * *